July 12, 1949.   W. JOKEL   2,475,968
SELF-CLEANING FILTER
Filed Jan. 8, 1945   3 Sheets-Sheet 1
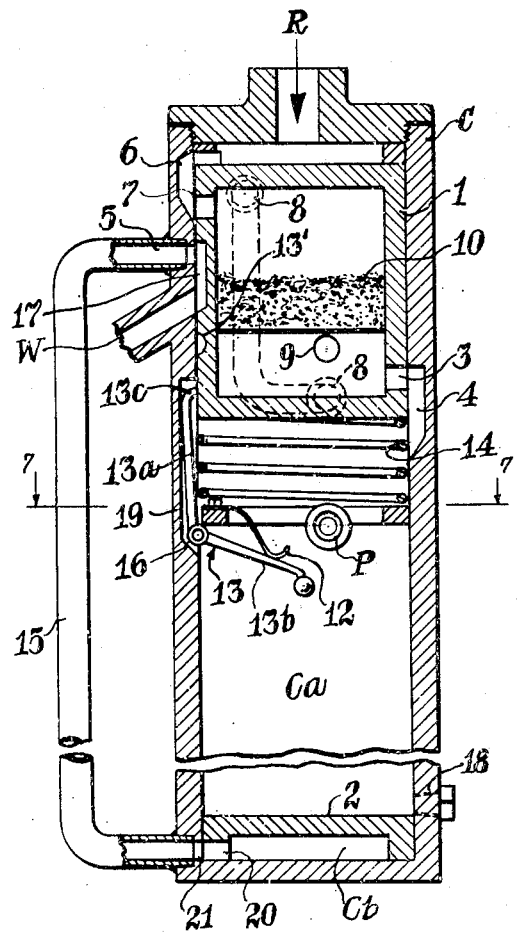
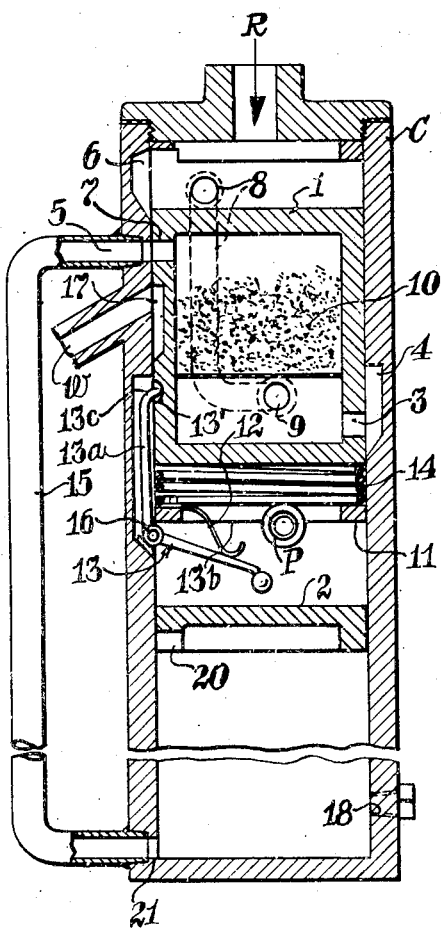
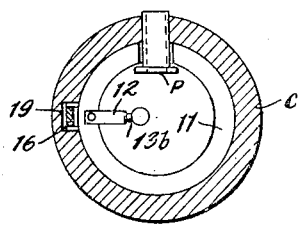
INVENTOR.
William Jokel
BY
ATTORNEY July 12, 1949.　　　　W. JOKEL　　　　2,475,968
SELF-CLEANING FILTER
Filed Jan. 8, 1945　　　　　　　　　　3 Sheets-Sheet 2
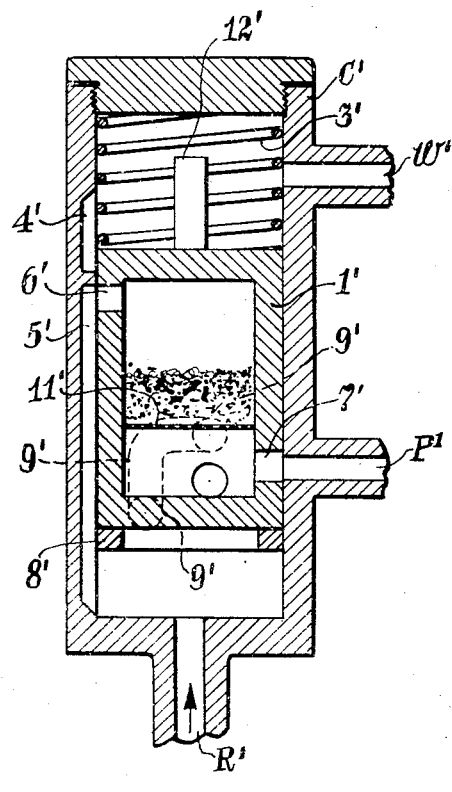
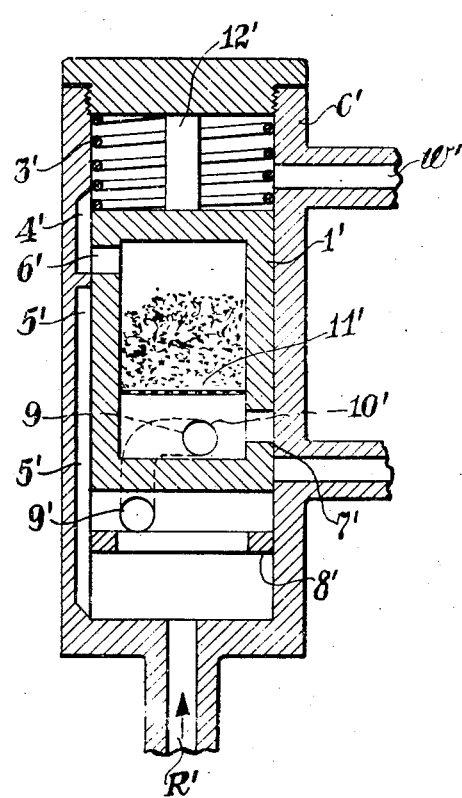
INVENTOR.
William Jokel
BY
Joseph E. O'Brien
ATTORNEY July 12, 1949.　　　　W. JOKEL　　　　2,475,968
SELF-CLEANING FILTER
Filed Jan. 8, 1945　　　　　　　　　　3 Sheets-Sheet 3
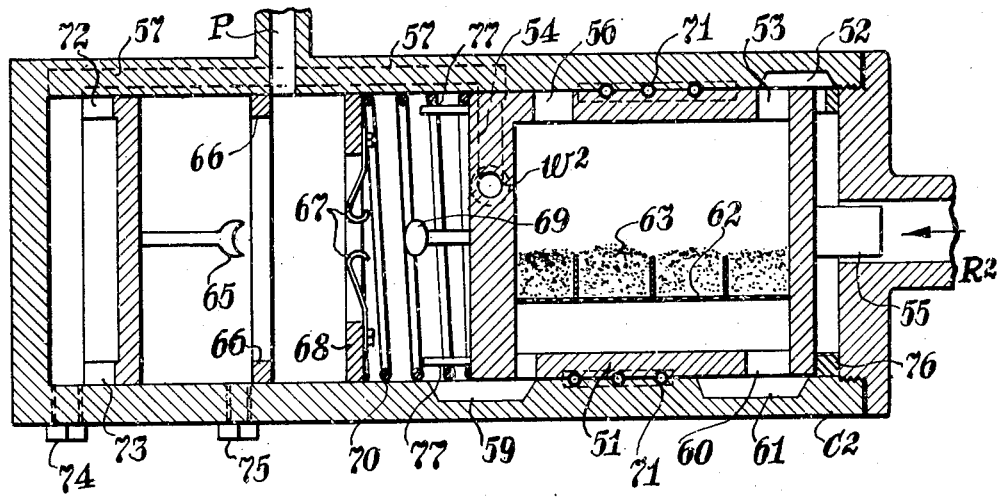
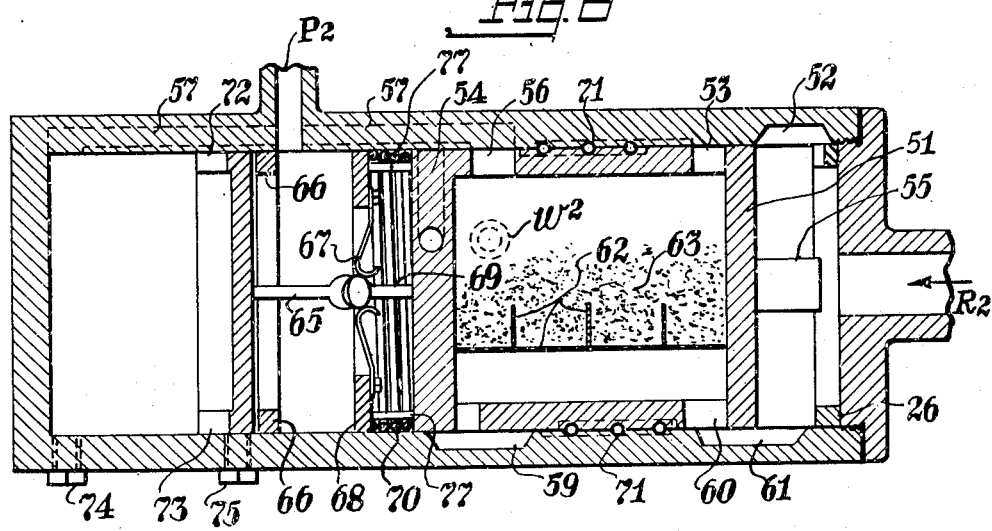
INVENTOR.
William Jokel
BY Joseph F. O'Brien
ATTORNEY Patented July 12, 1949

2,475,968

UNITED STATES PATENT OFFICE 2,475,968

SELF-CLEANING FILTER

William Jokei, Brooklyn, N. Y.

Application January 8, 1945, Serial No. 571,824

2 Claims. (Cl. 210—144)

This invention relates to improvements in self-cleaning filters for liquids in which the liquid to be filtered is fed under pressure and the filter-bed may be cleaned by a reverse flow of the liquid, and more particularly comprises an improvement upon the type of filter shown and described in my United States Letters Patent #2,366,112, dated December 26, 1944, which discloses a filter-medium contained in a reciprocating hollow piston movable automatically by pressure caused by clogging of the filter-bed from filtering position to self-cleaning position and also movable reversely to normal filtering position by a restoration of permeability of the filter-bed due to the cleaning thereof.

One of the objects of my present invention is to provide a filter of the type specified in which the intake flow of liquid will be continuous, the stoppage thereof during the cleaning period being avoided, and the valves used to stop such intake flow will be eliminated.

Another object of my invention is to provide a filter of the type specified in which the reverse filter-cleansing flow of the liquid will comprise the passage through the filter bed and filtering medium in reverse direction of a predetermined quantity of liquid under pressure sufficient to provide a thorough cleaning of the filter bed and filtering medium instead of relying upon the permeability of the filter-bed to restore the parts to normal position.

Still another object of my invention is to provide a device of the character specified in which the restoration of the parts to normal filtering condition will be positively accomplished automatically upon the passage under pressure of a given quantity of liquid in reverse direction through the filter-bed.

Still another object of my invention is to provide a construction in which undesirable branch-pipes from the intake of the filter will be eliminated.

Still another object of my invention is to provide a construction in which the automatic restoring movement of the bed-carrying piston or vessel from cleansing to filtering position will be positive and instantaneous.

Another object of my invention is to provide, in combination with my said spring-pressed reciprocable piston, an automatic locking device adapted to positively hold the piston in cleaning position until a quantity of liquid which may be precisely predetermined and sufficient for cleansing purposes is passed through the filter-bed in reverse direction.

Another object of my invention is to utilize means to provide for a continuous non-stop flow of the liquid being filtered and especially for the continuity of pressure flow of the liquid during the period when the filter is out of action for self-cleaning.

Still another object of my invention is to provide a structure which will be adapted for large scale operations.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, which may be interpreted as illustrative and not in a limiting sense. Various changes may be made in the details of construction without departing from the spirit of the invention as defined by the appended claims.

Fig. 1 is a vertical section of my filter in normal filtering position;

Fig. 2 is a similar view of the filter shown in Fig. 1 with the parts in self-cleaning position;

Fig. 3 is a modified form of filter in normal filtering position and showing the intake and actuating spring in inverted position and the means for determining the quantity of self-cleaning liquid is omitted;

Fig. 4 is a similar view of the modified form of filter shown in Fig. 3 with the parts in self-cleansing position;

Fig. 5 is a sectional view of another modified form of my invention in which the filter is disposed in horizontal position and the filter-bed is positioned parallel to the axis of movement of the piston and the filter parts are in normal filtering position;

Fig. 6 is a similar section of the device shown in Fig. 5 with the parts in self-cleansing position; and Fig. 7 is a section on the line 7—7 of Fig. 1 looking in the direction of the arrows.

Referring to drawing Figs. 1 and 2, this filtering device comprises the filter casing C having a main-inlet R for raw or crude liquid, a main exhaust P for the filtered liquid, a main exhaust W for the waste, and a hollow piston or vessel I fitting in casing C for free axial movement or reciprocation in said casing C. As illustrated, a coil spring 14 is inserted in the casing C, located between the bottom surface of the piston or vessel I and a spring-abutting ring 11 to provide spring pressure operable against the dynamic pressure of the inflowing liquid from the main inlet R, and to yieldingly hold the piston or vessel 1 in its normal working or filtering position against such dynamic pressure. 10 is a filter-bed preferably comprising a strainer which may be formed of wire-netting, perforated sheet metal or other suitable material. One or more of such strainers preferably extend transversely across the longitudinal axis of the cavity of the vessel and a body or layer of loose filtering material is supported on such strainer or strainers. As shown, the piston 1 has three ports comprising an inlet port 7 located, as shown, above the filter-bed 10, and an outlet port 3 located at the opposite side or below the filter-bed. Filtered liquid in the normal filtering operation of the filter passes through the port 3. A port 9 is also provided in the piston 1, positioned below the filter-bed 10 and adapted in cleansing position of the piston to function as an inlet or in-take port for the cleansing liquid and to cooperate with a cleansing-liquid inlet conduit 8 embodied in or connected with the casing C.

The casing C, in addition to said main inlet-port R, main-exhaust P and main-waste port W, is provided with communicating cleansing-liquid-circulating ports 5 and 21 adapted to circulate filter-cleansing liquid in the casing C and cooperate with reciprocating auxiliary piston 2 to provide liquid-measuring mechanism for the cleansing liquid. The casing C also has three additional conduits, the conduit 6 being adapted to cooperate with the port 7 in providing for the continuous flow of liquid from the piston-inlet port 7 to the filter-bed during the normal filtering operation of the device, the conduit 4 being arranged to receive and conduct the filtered liquid to the exhaust P during such normal filtering operation, and the conduit 8 being adapted to cooperate with the casing inlet R and the piston port 9 to conduct the incoming liquid in reverse flow when the piston of the device is moved to the position shown in Fig. 2. The casing C also is preferably provided with a groove 19 to provide a housing for one arm of a locking mechanism adapted to engage and disengage with a notch 13' in the piston 1.

As illustrated, the said locking mechanism comprises a spring-pressed bell-crank 13 pivoted on pivot 16 to the casing C and adapted automatically to latch the piston 1 in self-cleansing position when the same is moved thereto. As shown, the bell-crank has an upright arm 13ª housed and movable in groove 19 and provided at its upper end with a hooked nose 13ᶜ which, upon pivotal movement of the bell-crank lever, is adapted to engage and disengage with the notch 13' in the piston. The other arm 13ᵇ of the bell-crank 13 projects outwardly from the pivot 16 and is pressed downwardly by a flat spring 12 to cause the arm 13ª to be resiliently held in position to engage the notch 13' when the piston is lowered in the casing. The flat spring 12 is, as shown, fixed at one end to the ring 11 mounted on the inner wall of the casing and has its free end pressing against the said arm 13ᵇ. The said ring 11 functions as an abutment for one end of the coil spring and as a limiting device for the movement of the piston 1, and also comprises a stop for causing registration of the hooked nose 13ᶜ of the arm 13ª with the notch 13' in the outer wall of the piston 1.

My preferred means for automatically releasing the latching engagement of the bell-crank arm with the piston 1 comprises an auxiliary reciprocating piston 2 provided with a port 20 adapted in the normal filtering position of the filter to register with the liquid circulating port 21 of the casing. The port 21 is connected, as shown, by conduit 15 to permit circulation of liquid from the port 5 through the ports 21 and 20 to the shallow-chamber Cᵇ beneath the auxiliary piston 2, which will thereupon be raised, as illustrated in Fig. 2, and will engage and raise the arm 13ᵇ of the bell-crank 19 which will swing the arm 13ª to release the nose 13ᶜ from the piston-notch 13', thus releasing the piston 1 and permitting the coil spring 14 to move said piston 1 upwardly into the normal filtering position shown in Fig. 1.

The filter shown in Figs. 1 and 2 operates as follows: During the normal filtering operation of the filter, the raw liquid enters the casing C at R and is forced by pressure to pass through groove 6 in the casing and port 7 in the piston or vessel 1, and thence through the filter-bed comprising the strainer 10 and body of loose filtering material. The raw liquid is thus freed from admixed impurities or foreign bodies and this filtered liquid passes through port 3 and conduit 4 into the chamber Cª and fills the space therein above the piston 2 until the level thereof reaches the main exhaust port P. The area of the port P is preferably limited in order to cause an upward pressure by such liquid against piston 1 and to force the piston 2 downwardly. When the chamber Cª is filled there will be stored within the same a quantity of filtered liquid which presses the piston 2 downwardly until it shall have moved down to its extreme position at the bottom of the casing. In this way, a constant non-stop flow of cleansed liquid is maintained in the filter. In the normal filtering position of the device, the liquid inlet port 9 of the piston 1 which admits raw liquid to the piston for filter-cleansing purposes, will be out of registration with the conduit 8 and thus is completely closed by the casing wall and conduit 8 is also completely closed and blocked to access of liquid by the wall of the piston, as shown in Fig. 1. When, however, the filtering medium or layer on the strainer becomes clogged by impurities or foreign bodies, the pressure of the raw liquid fed at R will overcome the resistance and compress the spring 14 to depress the piston 1 into the position shown in Fig. 2. When the piston is thus lowered the hooked upper end of the arm 13ª, which is constantly pressed toward the wall of the piston, will slide into the notch 13' in the side wall of the piston 1 and the piston will be latched in its lower extreme position. The connection or communication of the conduit 6 with the piston port 7 will also be cut off and the port 7 will be caused to register with the liquid circulating port 5 of the casing C and simultaneously the upper end of the conduit 8 will be opened to the flow of raw liquid under pressure from the inlet R. Such liquid will pass through this conduit 8, the lower end of which is also simultaneously caused to register with the port 9 located below the filter-bed in the piston. The raw liquid thus passes through conduit 8 and port 9 and flows in the reverse direction upwardly through the strainer, lifting and rinsing the filtering material supported thereon. Said cleansing liquid with all the impurities of the filter-bed and strainer is now initially passed through piston port 7, casing port 5 and through pipe 15, port 21 and port 20 into the shallow compartment $C^b$ beneath the auxiliary piston 2 and functions to release the piston 1. Thus, the piston 2 is lifted upwardly until the upper surface thereof engages the bell-crank lever arm $13^b$ to move the piston-latching arm $13^a$ thereof out of engagement with the notch 13'. At this time, the clogging and resistance to pressure of the impurities in the strainer and filter layer being eliminated, the coil spring 14 will shift the piston 1 upwardly to its normal filtering position, whereupon the entrance to the conduit 8 will be closed and the filtering liquid will again be fed through conduit 6 and port 7 above the filtering bed. In this filtering position, the port 5 of the conduit 15 will be placed into registration with the conduit 17 of the piston which communicates with the main waste pipe W, and upon further operation of the filter the normal pressure of liquid above the auxiliary piston 2 will force said piston 2 downwardly and will cause the reverse outward movement of the impure liquid through the conduit 15 and to the waste pipe W. The normal filtering or working of the filter will then continue until the strainer or filter bed is again clogged, whereupon the cycle will be repeated.

In the drawings, Figs. 3 and 4 show a different way to locate the coil spring or similar means, thus avoiding its constant overload. For simplification, in this drawing the retarding or timing device has been omitted. This filter comprises the casing C' with three main ports, R' for raw-liquid intake, P' for purified liquid outlet, W' for waste-exhaust and three conduits 4', 5', 9' (all working on the same principle as Figs. 1 and 2 show). A hollow piston 1' is snugly fitted within the casing and is freely axially and reciprocatingly-movable therein. The piston has three ports 6', 7' and 10' cooperating with the casing conduits as hereinafter specified. A coil spring 3' is inserted in casing C' between its inner top-end and the top of hollow piston 1'. An adjusting-ring 8' fixes the path of piston 1 downwardly and thus brings ports 9' and 10', as well as conduits 6' and 5' into registration. Pin 12' is limiting the movement of piston 1' upwardly, forcing the aligned ports 9' and 10' and correspondingly 4' and 6' to register, when piston 1 has moved into its extreme top-position. A strainer with filtering layer is provided across cavity of piston 1' in the same way as in Figs. 1 and 2 shown and described.

The operation of the filter shown in Figs. 3 and 4 is as follows:

Fig. 3 shows normal filtering position. The raw or crude liquid is fed in by pressure at R' and flows through conduit 5' and ports 6' and through strainer 11' and its layer downwardly into the lower chamber of the cavity in piston 1' and is discharged cleaned over port 7' at P'. When the strainer and its layer become clogged up with retained impurities or foreign bodies from the raw-liquid, the inner resistance in the strainer and layer will, through over-pressure of the incoming raw-liquid, overcome the tension of spring 3' and will shift piston 1' to its top position, the movement being limited and the position fixed by pin 12' thereon. In this position, conduit 5' is shut off from port 6' and the piston-cavity while ports 9' and 10' and correspondingly ports 4' and 6', which are aligned, come into registry. The crude liquid will now flow reversely (Fig. 4) through 9' and 10' into piston cavity underneath the strainer and thence upwardly through strainer 11', lifting and rinsing its layer to clean the same from its adhering impurities, and thereafter flowing through ports 6' and conduit 4' through casing cavity to conduit W', as waste. Meanwhile port 7' and conduit P' are shut off by the piston wall. As soon as the resistance in the strainer unit has ceased, spring 3' moves piston 2' back into its lower position (Fig. 4), shutting off piston port 10' from communication with conduit 9', also cutting off conduit 4' from piston port 6' and re-establishing the communication between inlet R', conduit 5' and port 6' to conduct liquid to the upper side of the strainer and while port 7' and conduit P' underneath the plane of the strainer are moved into registration, thus continuing the normal cleaning operation. Waste conduit W' remains continually open to the upper part of the casing but this casing portion is disconnected from the piston and the filtering flow of liquid in the normal filtering position shown in Fig. 3.

Figs. 5 and 6 are sectional views of a device suitable for large-scale structural designs for providing a continuous supply of cleaned liquid for recovery of foreign bodies from raw-liquid in which they had been suspended and includes a latching device for retarding the returning movement of the piston and thus increasing the cleaning period to secure a perfect cleaning without disturbances due to vibrations. These views also include the provision of ball-bearing elements between casing and piston or vessel-walls to provide controlled easy movement of a heavy piston and to cause the actuating coil spring to be placed under low and transitory compression only, and a modified disposition of the strainer and its loose filtering layer, showing the strainer with vertical partitions extending across the strainer and somewhat higher than the filter layer, for equalizing the filtering layer all over the strainer. In Figs. 5 and 6 reference character $C^2$ designates the casing of the filter which has three compartments, the first one being immediately adjacent to the main-intake $R^2$, and partitioned from said intake by one end of a hollow piston 51 which is fittingly inserted in the casing $C^2$ and freely movable axially in it. The second chamber is located between outer bottom of the hollow piston or vessel 51 and another piston 64, which is axially movable in the end of casing 1 opposite to the inlet $R^2$. Piston 64 has two ports: one comprising port 72 aligned with conduit 57 in the casing and the other port 73 being aligned with the sludge-drains 74 and 75. The third compartment is formed by piston 64 and the inner bottom of the casing $C^2$. All these three chambers vary in volume according to the end positions of the pistons 51 and 64. Casing $C^2$ has a main-inlet $R^2$ for the raw-liquid, a main outlet $P^2$ for the cleaned liquid and a main exhaust $W^2$ for the waste and for the recovery of the solid particles floating in the concentrated liquid suspension. 52, 57, 59, 61 are conduits in the casing $C^2$. In piston 51 there are four ports 53, 56, 58 and 60 and a conduit 54. In the normal working position, the pairs of ports 52, 53, 58, 59, 54 and 57 and $W^2$—64 are aligned and in register, the ports 54—56 and 6—61 being shut off. In the cleaning period, ports 52—53, 54—57—$W^2$—54—58—59 are shut off, whereas 60—61 and 56—57 communicate. Inserted in and extending axially along the cavity of vessel or piston 51 is a strainer 62, consisting of mesh-sieve, perforated sheet or the like, consisting mainly of metal or any suitable rigid material in one or more layers and the mesh may be coarse or fine or combined coarse and fine, and a body of loose filtering material is supported on said strainer. In order to secure an even layer of filtering material, there may be disposed circular segment-like partitions 63 on the strainer 62. In special cases, the loose body of filtering material may, if desired, be replaced by a more stable strainer-structure.

Ball-bearings 71 between casing $C^2$ and wall of piston 51 are provided for easy movement of vessel 51, even in large designs. The coil spring 70, inserted in casing $C^2$ between ring 68 and bottom-outside of vessel 51 acts yieldingly against the latter. A ringlike prong 77 on the outer bottom of vessel 51, when contacting ring 68, fixes one end-position of vessel 51, whereas buffers 76 in the intake-end of casing $C^2$ (keeping the intake-conduit 52 open) fix the other extreme position of vessel 51. In the same way the two end-positions of piston 64 are fixed by ring 66 on the one hand and by the inner bottom of the casing $C^2$ and is freely movable axially in it. The latching and retarding device comprises the pin 69 or the like on outer bottom of vessel 51, a pin 65 on the opposite-top of the piston 64 and one or more flat springs 67 or the like projecting radially from the fixed ring 68. Pin 55 on top of vessel 51 keeps the sectional area of the intake normal, but opens it wide in the self-cleaning period, when the vessel moves into its latched cleaning position. 74 and 75 are sludge-drain-bolts.

The filter of Figs. 5 and 6 operates as follows:

Referring to Fig. 5, the raw-liquid enters the filtering casing at $R^2$ and flows over conduits 52 and 53 and downwardly through the layer of filtering material and strainer, thence passing through port 58 and conduit 59, filling the second chamber between both pistons 51 and 64 and flowing out at $P^2$ as cleaned liquid. The surplus-liquid which does not pass through the relatively narrow area of $P^2$ will push the piston 64 back to its end-position at the casing-bottom, as shown in said Fig. 5.

Referring to Fig. 6, when the strainer becomes clogged up, the pressure of the raw-liquid at $R^2$ moves piston 51 in the direction of flow till buffer-prong 77 strikes adjusting-ring 68 and pin 69 will then latch in the springs 67, or in similar device. Now 52—53 and 58—59 are shut off, whereas 60—61 and 56—57 correspondingly register. Movement of the vessel 51 causes pin 55 to open inlet $R^2$ wide for increasing the speed of the liquid to rinse the strainer and its layer. The raw-liquid from $R^2$ now flows reversely over 60—61 upwardly through the strainer, rinsing it and lifting and bubbling its layer, then flowing over 56—57 under pressure into the chamber between piston 64 and bottom of casing $C^2$. As there is no exhaust open, piston 64 with its latching pin 65 will move towards the flat-springs 67, bending the springs into open position and striking the latching-pin 69 and so allowing coil spring 70 to shift the piston 51 back into its working position shown in Fig. 5 in which ports 61—60 and 56—57 are shut off and communication is re-established between the channels at conduits 52—53—58—59 and 57—54 and exhaust $W^2$. The normal working or filtering condition thus starts again, as described hereinabove, with the normal flow downwardly, and pin 5, narrowing the area of $R^2$ for normal pressure, with the cleaned liquid discharging at $P^2$ and the surplus of it accumulating in the second compartment to move piston 64 into its extreme position at the bottom of the casing $C^2$, thus forcing out the waste, which had been pressed into the compartment between piston 64 and the casing in the self-cleaning period through conduits 57—54 to be discharged at $W^2$. The latching device will measure the cleaning period, and unforseen and uncontrolled oscillating vibrations of the coil spring 70 will be avoided. The dimensions of the two chambers in casing $C^2$ between its bottom and the locking end position of the hollow piston 51 may be adjusted, as desirable, and the areas thereof can be calculated to produce the best results. This filter will thus work in the described cycle of movement for long periods without being supervised and without repairs or replacing parts.

Having described my invention, I claim:

1. A self-cleaning filter comprising, in combination, a casing adapted to be inserted in a liquid circulating system, said casing having a cylindrical internal chamber provided with a raw-liquid inlet and having a filtered-liquid outlet positioned in spaced relationship to said inlet, a reciprocable hollow piston in said casing-chamber arranged between said raw-liquid inlet and filtered-liquid outlet to divide said casing chamber into a raw-liquid chamber at the outer side of one end of said piston and a filtered-liquid chamber at the outer side of the opposite end thereof, said piston being movable alternately in said casing chamber into filtering and filter-cleaning positions and having an internal filtering chamber provided with a mass of filtering medium and supporting means therefor mounted to extend across said filtering chamber and to divide the same into raw liquid and filtered liquid areas, a feed conduit connected with the casing for feeding raw liquid from said raw-liquid chamber of the casing to said raw liquid area of the filtering chamber of the piston, said feed-conduit having inlet and outlet portions communicating with said raw-liquid chamber, a filtered-liquid conduit connected with said casing in spaced relationship from said raw-liquid feed conduit, said filtered-liquid conduit having its outlet portion communicating with said filtered-liquid chamber and its inlet portion communicating with the internal surface of the casing facing said piston, said piston having at one end thereof in its side wall a piston-feed port having its inlet end adapted in filtering position of the piston to register with the outlet portion of said raw-liquid feed conduit and having its outlet end communicating with said raw liquid area of the piston, whereby in said filtering position raw liquid is passed to said filtering area, a second port in the side wall of the piston having its inlet communicating with said filtering liquid area and having its outlet communicating with said filtered liquid conduit, said filtered liquid conduit being openable and closable by said movement of the piston and being adapted, when the piston is in filtering position, to pass filtered liquid to the outlet, a third conduit connected with said casing and having an inlet portion communicating with said raw liquid chamber and being provided with an outlet portion in the wall of the casing chamber facing the portion of said casing chamber occupied by said piston and in juxtaposition to the filtered liquid area of said piston, said piston having a third port within said filter-liquid area adapted to register in the filter-cleaning position thereof with said outlet portion of said third conduit whereby, upon movement of the piston to cleaning position, raw liquid will be passed into said filtered liquid area and in reverse direction through said filtering medium to clean the same, a fourth conduit connected with said casing and having an inlet port communicating with said casing chamber and adapted, in cleaning position of the piston, to register with said feed port of the piston and to remove impure liquid therefrom, a spring-supporting means positioned within said casing chamber, a spring mounted on said supporting means and adapted to yieldingly press said piston to filtering position and also adapted, upon counterpressure of the liquid, to be compressed and to permit movement of said piston to filter cleaning position.

2. A self-cleaning filter as claimed in claim 1 in which latching means are mounted within the casing chamber beneath said piston to latch the same upon movement thereof into cleaning position by said counterpressure of the liquid, a liquid circulating conduit for impure water is connected with the casing, means is also mounted within said casing chamber and movable by said circulated impure liquid to release said latching means and to permit said spring to move said piston into filtering position and to normally retain the same in said position.

WILLIAM JOKEL.

REFERENCES CITED

The following references are of record in the file of this patent:

UNITED STATES PATENTS

| Number | Name | Date |
|---|---|---|
| 864,810 | Taylor | Sept. 3, 1907 |
| 1,246,850 | Best | Nov. 20, 1917 |
| 1,682,757 | Hopkins | Sept. 4, 1928 |
| 2,253,690 | Dalrymple | Aug. 26, 1941 |
| 2,338,417 | Forrest et al. | Jan. 4, 1944 |
| 2,366,112 | Jokel | Dec. 26, 1944 |